United States Patent Office 2,702,292
Patented Feb. 15, 1955

2,702,292

N-(5-NITRO-2-FURFURYLIDENE)-3-AMINO-3,4,5,6,-TETRAHYDRO-1,3,-OXAZINE-2-ONE

Kenyon J. Hayes, Norwich, N. Y., assignor, by mesne assignments, to The Norwich Pharmacal Company, Norwich, N. Y., a corporation of New York No Drawing. Application August 5, 1953,
Serial No. 372,590

1 Claim. (Cl. 260—240)

This invention relates to a new chemical compound N - (5 - nitro - 2 - furfurylidene) - 3 - amino - 3,4,5,6,- tetrahydro-1,3,-oxazine-2-one described by the formula:

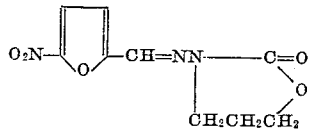

I have discovered that this new compound is distinguished by the high order of chemotherapeutic activity which it exhibits in combating microbial infections in animals when administered orally in sub-toxic amounts.

This new compound has proved highly successful upon oral administration in the treatment of animals lethally infected with Salmonella typhosa and Salmonella choleraesuis organisms. The first named organism is the causative agent of typhoid fever, a disease which has proved resistant to treatment with known chemotherapeutic agents; while the latter organism is associated with hog cholera, a disease which presents a real problem in veterinary medicine because of the mortality resulting therefrom and, in the absence of mortality, a lowering in weight gain of the animal, such sub-normal growth resulting in serious economic loss to the raiser. The organism, Salmonella choleraesuis, has also been known to cause gastroenteritis in man.

The preparation of the new drug in a form which will permit ready oral administration is easy. It may be incorporated in tablets, gelatin capsules, suspensions or compositions consisting of suitable carriers and adjuvants common to pharmaceutical practice. In the treatment of animals, it can be incorporated in animal feed and prophylactic treatment is readily and successfully achieved thereby.

In order that my invention may be entirely available to those skilled in the art, a method for preparing it is described briefly:

EXAMPLE

*N-(5-nitro-2-furfurylidene)-3-amino-3,4,5,6,-tetrahydrol-1,3,-oxazine-2-one*

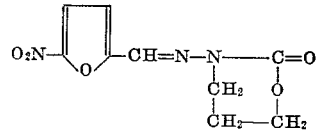

3-hydroxypropylhydrazine (B. P. 115–118° at 3 mm.) is obtained by the reaction of trimethylene chlorohydrin and excess hydrazine hydrate.

A mixture of 13.5 g. of 3-hydroxypropylhydrazine, 22.5 g. of ethyl carbonate and 0.4 g. of sodium methoxide on 2 cc. of methanol is heated. The ethanol formed in the reaction is removed by fractionation through a Vigreux column during forty minutes. The excess of ethyl carbonate is removed by distillation at the water-pump. A water-white, oily residue weighing 19.3 g. remains in the flask.

The oil is dissolved in 15 cc. of ethanol and 50 cc. of 5% hydrochloric acid is added. This solution is treated with a solution of 14 g. (66% of theoretical amount) of 5-nitro-2-furaldehyde in 25 cc. of hot ethanol. An orange yellow precipitate forms immediately. This is filtered with suction and washed with ethanol and ether. The yield is 12.9 to 15.8 g. (37 to 40%) of N-(5-nitro-2 - furfurylidene) - 3 - amino - 3,4,5,6, - tetrahydro-1,3,-oxazine-2-one of M. P. 264–265° C.

This can be further purified by crystallization from nitromethane to M. P. 267.5° C. It absorbs in the ultraviolet in water solution at 367.5 mu, $E_M$ 15,500. Its water solubility is 107 mg. per liter at 25° C.

What I claim is:

N - (5-nitro - 2 - furfurylidene) - amino - 3,4,5,6,- tetrahydro-1,3,-oxazine-2-one represented by the formula:

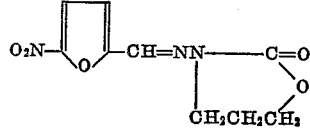

No references cited.